(12) United States Patent
Albornoz et al.

(10) Patent No.: US 8,839,092 B2
(45) Date of Patent: *Sep. 16, 2014

(54) MULTI-USER, MULTI-TIMED COLLABORATIVE ANNOTATION

(75) Inventors: Jordi A. Albornoz, Arlington, MA (US); Lee D. Feigenbaum, Brookline, MA (US); Sean J. Martin, Boston, MA (US); Simon L. Martin, Hursley (GB); Lonnie A. McCullough, Houston, TX (US); Elias Torres, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 1012 days.

This patent is subject to a terminal disclaimer.

(21) Appl. No.: 12/338,010

(22) Filed: Dec. 18, 2008

(65) Prior Publication Data

US 2009/0106642 A1   Apr. 23, 2009

Related U.S. Application Data

(63) Continuation of application No. 10/983,820, filed on Nov. 8, 2004, now Pat. No. 7,472,341.

(51) Int. Cl.
| | |
|---|---|
| *G06F 17/21* | (2006.01) |
| *G06F 17/24* | (2006.01) |
| *G06Q 10/10* | (2012.01) |
| *G06F 3/048* | (2013.01) |

(52) U.S. Cl.
CPC .................. *G06F 17/241* (2013.01); *G06Q 10/10* (2013.01)
USPC ........... 715/230; 715/231; 715/232; 715/233; 715/221; 715/224; 715/226; 715/255; 715/256; 715/751; 715/764

(58) Field of Classification Search
CPC .............................. G06F 17/241; G06Q 10/10
USPC ......... 715/230–233, 221, 224, 226, 255, 256, 715/751, 764
See application file for complete search history.

(56) References Cited

U.S. PATENT DOCUMENTS

| | | | |
|---|---|---|---|
| 5,239,466 A | 8/1993 | Morgan et al. | |
| 5,301,348 A * | 4/1994 | Jaaskelainen | 714/46 |
| 5,999,911 A * | 12/1999 | Berg et al. | 705/7.26 |
| 6,240,429 B1 | 5/2001 | Thornton et al. | |
| 6,342,906 B1 * | 1/2002 | Kumar et al. | 715/751 |
| 6,519,603 B1 * | 2/2003 | Bays et al. | 1/1 |
| 6,529,215 B2 | 3/2003 | Golovchinsky et al. | 715/764 |
| 6,565,611 B1 * | 5/2003 | Wilcox et al. | 715/203 |
| 6,599,324 B2 * | 7/2003 | Saito et al. | 715/234 |
| 6,721,921 B1 * | 4/2004 | Altman | 715/210 |
| 6,859,909 B1 | 2/2005 | Lerner et al. | 715/512 |
| 6,950,982 B1 | 9/2005 | Dourish | 715/512 |

(Continued)

*Primary Examiner* — Stephen Hong
*Assistant Examiner* — Wilson Tsui
(74) *Attorney, Agent, or Firm* — Fleit Gibbons Gutman Bongini & Bianco PL; Thomas Grzesik

(57) ABSTRACT

A displayed document comprises an annotation widget, the widget associated with an annotation document and a corresponding annotation key in an annotation store. The annotation document associated with a workflow action program. A user with a predetermined privilege selects a widget and is presented with the annotation document. The user performs an annotation task modifying the annotation document and submits the annotation document to the annotation store, the submission triggering the workflow action program to progress the workflow to another step.

26 Claims, 13 Drawing Sheets

(56) References Cited

U.S. PATENT DOCUMENTS

| | | |
|---|---|---|
| 7,111,230 B2 | 9/2006 | Euchner et al. ............... 715/512 |
| 7,584,199 B2 * | 9/2009 | Matsusaka ............................ 1/1 |
| 2003/0225764 A1 * | 12/2003 | Smith et al. ....................... 707/9 |
| 2004/0049345 A1 * | 3/2004 | McDonough et al. .......... 702/12 |
| 2004/0215610 A1 * | 10/2004 | Dixon et al. ....................... 707/3 |
| 2004/0260717 A1 | 12/2004 | Albornoz et al. ............. 707/102 |

* cited by examiner

JohnDoe-resume.doc  401

File  Edit  View  Insert  Format  Tools  Table  InsightLink  Window  Help   X

402

John Doe  407
123 Main St. Anytown, USA

408

403 Education   Important Institute of Technology
Ph. D. in Widget Construction

Select Annotation Form
Choose type of annotation to create  414
Select Type                Select Form Document Type              Form
<none>                     Accounting Report — 413
  410                      Candidate Resume Eval — 415
                            412        411

Selected Form: Candidate Resume Eval
Description: use to evaluate job candidate
based on Resume — 416
              417    418
             [ OK ] [ Cancel ]

404 Experience   American Widget C...
Chief Widget Maker
409
Widgets R Us
Widget Retailer 405 Skills   Languages: WidgetM...
Software:  EZWidg...
OS:        WidgetC...

406 Leadership   Widget Maker Medal
& Honors

FIG. 4

JohnDoe-resume.doc

File  Edit  View  Insert  Format  Tools

Create Annotation
Annotation Sharing          Submit   Close

* Title: 505    [John Doe for Widget Job]
* Maximum Education    ☐ University Degree
                       ☐ High School
* Type Employment      ● Full Time
                       ○ Part Time
* Prior Experience     ○ Extensive
                       ● Adequate
                       ○ Lacking
                       ○ None
* Resume Comments:     [This is a must interview !!]

🔒 Communication skill: ○ Excellent
                        ○ Average
                        ○ Poor
🔒 Interviewer Comment: [                    ]

Education
John Doe
123 Main S...
Important Institute ...
Ph. D. in Widget Co...

Experience
American Widget C...
Chief Widget Maker...
Widgets R Us
Widget Retailer

Skills
Languages: WidgetN...
Software: EZWidg...
OS: Widget0...

Leadership & Honors
Widget Maker Meda...

FIG. 5

JohnDoe-resume.doc — 401

File  Edit  View  Insert  Format  Tools

InsightLink Annotations

Previous  Next  Edit Rules  602

603 Search  in  Title ▽ 604   605

Total Annotatinos: 1  606

Sort Ascending by Title  607

John Doe for Widget Job evaluator
Updated July 26, 2004 4:51:46 PM  — 608

Rules:  609
☐ Modified Today  610
☐ Modified This Week 611

601  John Do[e]
Comment:  123 Main S[t]
Widget Job — 610

Education  Important Institute [of]
Ph. D. in Widget Co[...]

Experience  American Widget C[...]
Chief Widget Maker

Widgets R Us
Widget Retailer

Skills  Languages: WidgetN[...]
Software:  EZWidg[...]
OS:  Widget[...]

Leadership  Widget Maker Meda[l]
& Honors

FIG. 6

JohnDoe-resume.doc — 401

File  Edit  View  Insert  Format  Tools

Create Annotation
Annotation Sharing          502  503
                          Submit  Close John Doe — 710
123 Main S...

Education
Important Institute ...
Ph. D. in Widget Co...

- Title: 505 — 504 — [John Doe for Widget Job]
- Maximum Education □ University Degree — 506
  □ High School
- Type Employment 507
  ● Full Time — 508
  ○ Part Time
- Prior Experience 509
  ○ Extensive
  ● Adequate — 510
  ○ Lacking
  ○ None — 513
- Resume Comments: 511 [This is a must interview !!]
* Communication skill: 512
  ● Excellent — 701
  ○ Average — 514
  ○ Poor — 702
* Interviewer Comment: 515 [Great Fit for our culture!]

Experience
American Widget C...
Chief Widget Maker...

Widgets R Us
Widget Retailer

Skills
Languages: WidgetN...
Software: EZWidg...
          Widget0...
OS:

Leadership
Widget Maker Meda...
& Honors

JohnDoe-resume.doc

File  Edit  View  Insert  Format  Tools

810

Create Annotation

Annotation Sharing    502    Submit  Close

John Do(
123 Main S

Education   Important Institute o
Ph. D. in Widget Co

Experience  American Widget C
Chief Widget Maker

Widgets R Us
Widget Retailer

Skills  Languages: WidgetM
Software:    EZWidg
OS:          WidgetC

Leadership  Widget Maker Meda
& Honors

- Type Employment    ☐ Full Time
                     ☐ Part Time
- Prior Experience   ○ Extensive
                     ● Adequate
                     ○ Lacking
                     ○ None
- Resume Comments:   This is a must
                     interview !!
- Communication skill: ● Excellent
                       ○ Average
                       ○ Poor
- Interviewer Comment: Great Fit for our
                       culture
  * Salary: 801        $150,000
  * Hire?: 802    803  ● Yes  804
                       ○ No

FIG. 8

5_diabetes_keytone.doc 1302

File Edit View Insert Format Tools Table InsightLink Window Help  X

1303

Diabetes is a malfunction in the body's ability to convert 1304 — Cmt: energy
(carbohydrates) sweets and starchy foods, such as fruits,
breads and vegetables--into energy to power the body.
The medical term for this is diabetes mellitus meaning
"honey-sweet
diabetes". Diabetes is characterized by abnormally high
and persistant concentration of sugar in the bloodstream. 1305 — Cmt: Thirst
Other characteristics are sugar in the urine, excessive
urine production, unusual thirst and hunger. People
affected with diabetes require life long medical care to
control the disease.
Carbohydrates are a problem not so much for the
carbohydrates per se, but the way the body uses then to
create energy. The progess of converting food into energy
is called metabolism. Thus diabetes mellitus is a metabolic
system disorder.
In a normal body, carbohydrates are converted to glusose 1306 — Cmt: Carbs
and other simple sugars in the stomach and small
intestines. Glucose moves from these organs into the

FIG. 13

MULTI-USER, MULTI-TIMED COLLABORATIVE ANNOTATION

CROSS-REFERENCE TO RELATED APPLICATIONS

The present patent application is a continuation of U.S. patent application Ser. No. 10/983,820 now U.S. Pat. No. 7,472,341, which was filed on Nov. 8, 2004 and commonly assigned herewith to International Business Machines, which is hereby incorporated by reference in its entirety.

FIELD OF THE INVENTION

The present invention is related to computer software. It is more particularly related to GUI assisted Workflow process control.

BACKGROUND OF THE INVENTION

This invention deals with the area of collaborative software. Collaborative software provides systems which aid multiple users in performing a task that requires the skills and attention of a plurality of people.

One type of collaborative software is an annotation system. An annotation system is one where descriptive information is stored about objects, or parts of objects. An annotation store, typically a database, contains the descriptive information for the annotation, and an indexing scheme is used to map each annotation to the object or the position within the object.

Annotation systems may store the annotations within the target document's data stream, thus simplifying the tasks of discovery and retrieval of the annotations by the annotation system. Annotation systems which store annotations in that manner include the 'comments' functionality of the MICROSOFT Office suite of products or the 'annotation' markup feature of the Adobe Acrobat product.

Annotation systems may also store the annotations in a database independent of the target document's data stream, thus simplifying advanced queries across all annotation data and allowing annotation of read-only target documents. Annotation systems which store annotations in this manner include the IBM INSIGHTLINK product and the systems described in the disclosures (both have been filed as patents already): POU8-2003-0147, "Recovery of Lost Annotations via Digital Fingerprinting", and ROC8-2003-0446, "Universal Annotation Management System".

Annotation systems are in high demand in Life Sciences and biotech, but not limited solely to that domain.

Annotations systems are used to gather comments, that is, metadata, about some target data. Many annotation systems simply present a simple text field for users to insert free form comments. More advanced annotation systems present the user with multiple fields so that the user creates a structured annotation. When annotations are structured, the information becomes easier to index and query.

Today, annotation systems are simply used in a simplistic model where users input information of interest into annotations for the benefit of users, at a later time, who find this extra information and make use of the annotation's recorded insight. Essentially, users are asked to enter annotations for a possible benefit which will help a possible future user. That is the interaction model presented by current annotation systems. This model has multiple problems. Often users consider annotating a document a burden. The current annotation model does not help the user achieve any task directly and thus the user often perceives little value in putting forth the effort to annotate documents. If user's see direct benefit from annotations, such as in the special case where the annotations are intended for the same user who is annotating, as is taking notes upon a lecture, then the user is more likely to annotate a document. Even when a user does annotate documents within the current annotation model, the quality of the annotation suffers since the user cannot anticipate the future user that will read their annotations. This future user may be performing a very different task from the annotator. If the annotator had knowledge of the task and role of the future readers of his annotations, in essence, his audience, the annotator could more effectively mark up the document. Thus, there is a need for an annotation system which creates a new paradigm for annotations, a system that gives immediate benefit to the annotator by helping to accomplish the user's task and a system where the annotator knows more about the audience for his annotations and can thus create more effective annotations.

U.S. Pat. No. 5,239,466 "System for selectively routing and merging independent annotations to a document at remote locations" Filed Oct. 4, 1990 and incorporated herein by reference deals with using annotations as sticky notes to conduct communication over long (physical) distances. This is accomplished by allowing annotations containing pointers to original documents to be sent singularly or in groups and reassembled at the receiving end by a "personal communicating computer." This patent does not deal with structured annotations, and does not provide the well-defined and structured multi-user semantics that comprise the novel combination of target-data-independent annotation combined with workflow. Furthermore, this invention only relates annotations together via a grouping mechanism. It does not allow for additional semantic workflow information to be-associated (within the system) with a series of annotations (or a single annotation over its lifetime) on a target object.

U.S. Pat. No. 6,240,429 "Using attached properties to provide document services" Filed Aug. 31, 1998 and incorporated herein by reference provides for associating key-value properties with documents within a document-management system. As such, this invention requires that all data objects to which properties or code may be attached must exist within a document management system. (This limitation exists because the properties and executable code are accessed via file operations such as 'read'.) This is a significant limitation because the properties and workflow information are part of data object.

Another type of collaborative software is workflow software. Workflow systems provide a way to automatically coordinate a task where different users accomplish individual portions of the task. A workflow system is a collaborative pipeline, where a process flow with a number of steps is implemented and includes means for notification at each step that action should be taken by a particular actor (actor could be a user or a program), and on the completion of the step, the next stage in the pipeline flow is invoked or informed. For example, a workflow system might be configured to automatically coordinate the task of fulfilling a customer order placed by telephone. In such a case, the workflow system might be configured to receive order or payment information from the telephone operator. The workflow system may then send a notification of pending work to the shipping department. Workflow systems typically show a personalized pending work list to each user. Once the item is shipped the shipping department marks their portion as complete in the workflow system and the system automatically sends a notification to the accounting department. This simple example illustrates how a workflow system can be configured with the steps in a specific task and the specific users involved in each portion of the task. The workflow system can then coordinate the execution of the task using notifications and task lists as the central interaction mechanisms. The limitations of the typical workflow software paradigm become apparent with tasks that are heavily based around data or a document. For example, the task of evaluating a candidate for a new position. This task is heavily related to the job application or resume as the key target document. At each step in the workflow, the document is referenced by the users. Typical workflow systems would separate the task from the document, simply referencing the document as an 'attachment' for reference by the users. This is in contrast to annotation systems which tightly couple the users' comments and judgments with the document itself. Thus there exists room for an improved workflow system where annotation is a key paradigm to accomplish the tasks in the workflow.

The key problem in current art is that annotation systems ignore the idea of workflow and tasks while workflow systems ignore the idea of annotation as a useful model for collaboration. Our invention merges these two collaboration approaches to provide an improved collaboration system.

SUMMARY OF THE INVENTION

The present invention provides annotation widgets located on an image of an annotated target document. A user selects an annotation widget to perform a workflow annotation task. The user is presented with an annotation form. When the user submits the annotation form to the annotation store, a workflow task is performed advancing the workflow to another workflow state.

It is therefore a goal of the invention to perform a Workflow Annotation task by retrieving a document from a document store. Then relating the document with one or more annotations in an annotation store, the annotation store comprising annotations and annotation keys, the one or more annotations related to the document by corresponding annotation keys. Then retrieving one or more annotations from the annotation store, the annotations related to the document by the corresponding annotation keys, the annotation widgets having corresponding annotation GUI widgets. Then displaying the document at a GUI interface, the displayed document having the one or more annotation GUI widgets overlaying predetermined portions of the displayed document, the one or more annotation GUI widgets comprising a first annotation widget. Then selecting the first widget by way of the GUI interface. Then responsive to selecting the first widget, retrieving the first annotation document from an annotation store. Then displaying at the GUI interface the retrieved first annotation document, the document comprising one or more fields. Then modifying by way of the GUI interface a first field of the one or more fields. Finally submitting the modified first annotation document to the annotation store, the submitting step comprising the further step of performing a workflow action.

It is another object of the invention to provide a user with an application to allow the user to create the first annotation document. Then relate the first annotation document with the first annotation widget. Then create the corresponding annotation key, the corresponding annotation key relating the first annotation document with the document. Then to associate a location of the document with the widget, the location for displaying the first annotation widget. Then to save the first annotation document and the corresponding annotation key in the annotation store.

It is another goal of the invention to perform a workflow action whereby workflow action is any one of ending the workflow, transforming the workflow to a next workflow step, changing the appearance of the first annotation widget, changing the location of the first annotation widget or informing another user of the workflow action.

It is another goal of the invention to display a task list with the displayed document.

It is another goal of the invention to customize the first annotation document for one or more user roles such that elements of the first annotation are displayed differently for a first user role than for a second user role.

It is another goal of the invention to provide an annotation document that comprises one or more annotation structures, an annotation structure comprising a title field for prompting a user for annotation data, the annotation document further comprising a data entry field for receiving user provided annotation data.

It is another goal of the invention to provide an annotation document that comprises one or more workflow notification annotation structures, a workflow notification annotation structure comprising a workflow title field, the workflow title field for prompting a user for a workflow action, the workflow notification annotation structure further comprising a workflow notification program for performing a workflow notification action.

It is another goal of the invention to provide a workflow action that comprises the further step of sending a notification to responsible users, the responsible users responsible for taking a next step in a workflow associated with the annotation.

It is another goal of the invention to provide notification that comprises any one of an email, a phone message, a text message, an instant message, a portion of the document or a portion of the annotation.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 is an example view of an Initial Resume Evaluator Screen for creating a new annotation;

FIG. 5 depicts an example Resume Evaluator Annotation view;

FIG. 6 depicts an example Initial Interviewer Screen view pending Annotation of a document;

FIG. 7 depicts an example Interviewer Annotation view;

FIG. 8 depicts an example Manager Annotation view;

FIG. 13 is a Document example document-centric Workflow task list based on Annotations.

The detailed description explains the preferred embodiments of the invention, together with advantages and features, by way of example with reference to the drawings.

DESCRIPTION OF THE PREFERRED EMBODIMENTS

Figure 1:
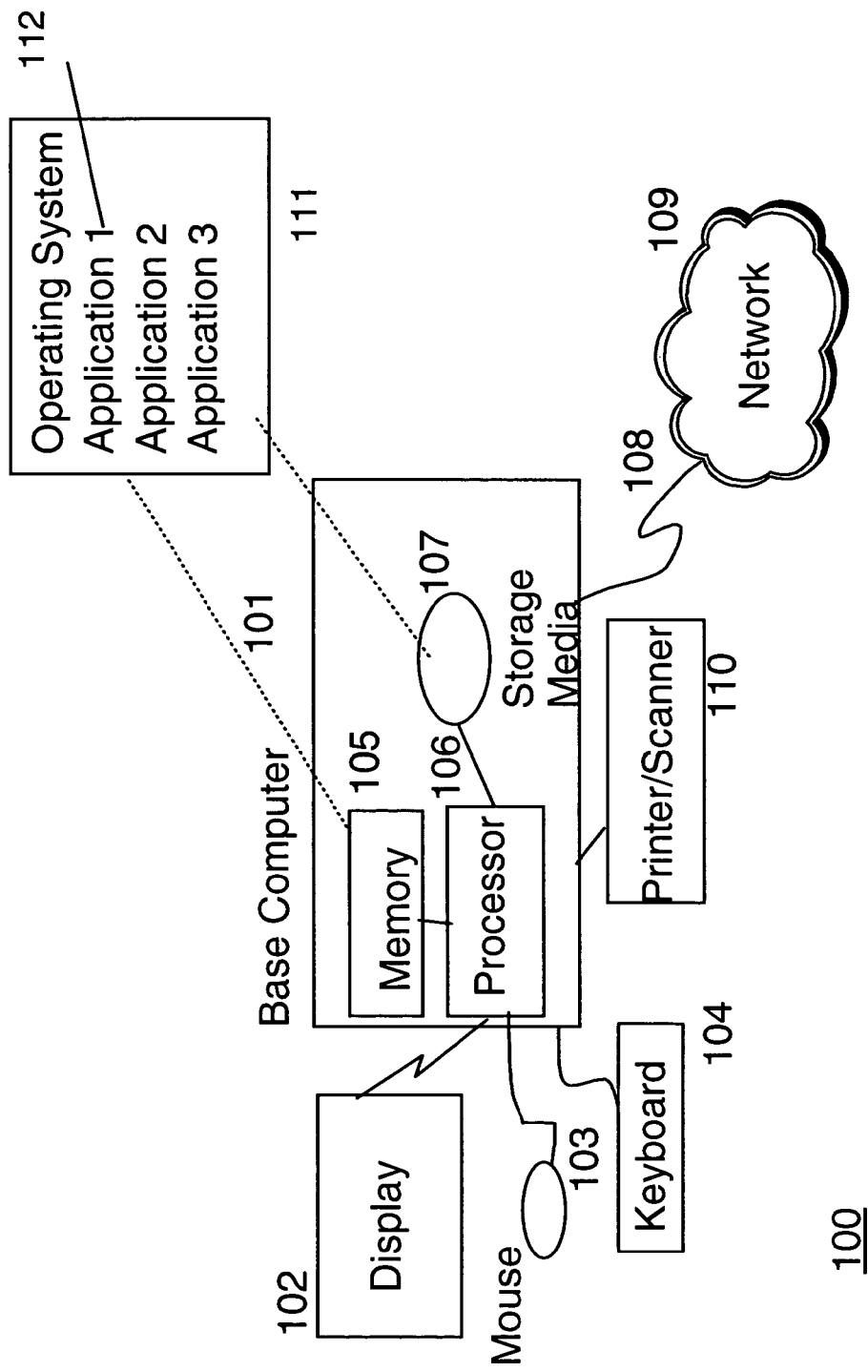
FIG. 1 is a diagram depicting prior art components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
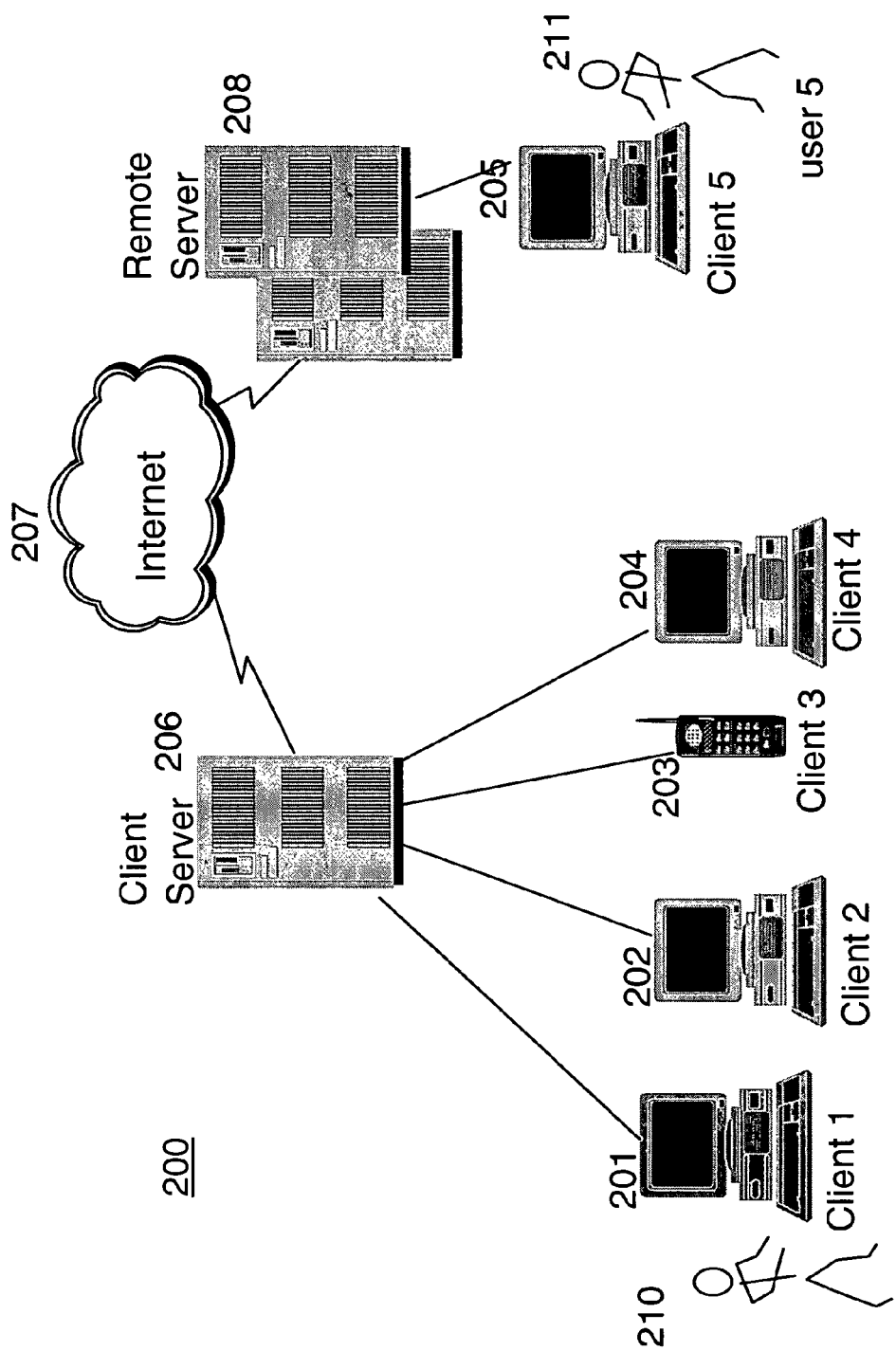
FIG. 2 is a diagram depicting a prior art network of computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM ESERVER, ZSERVER and 900 SERVER available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

Our invention is an annotation system for annotating a diverse variety of "documents" including for example Text or Images, wherein annotations can be collaboratively authored by multiple users at different times and from different machines. Also, as the annotation is collaboratively authored, different users may see different views of the annotation such as different data entry fields in the annotation according to their role or privileges. The annotation system also has the ability to notify users as appropriate that their attention to an annotation is required, such as when they must perform their portion of the annotation authoring or that previously authored annotations have been changed. Our invention provides the ability to attach a workflow to arbitrary target data via an annotation. A traditional workflow system is typically a standalone program, whereas annotation—by definition—is integrated with the data and so can easily enable workflow for all annotatable data without requiring a standalone workflow client program.

Figure 10:
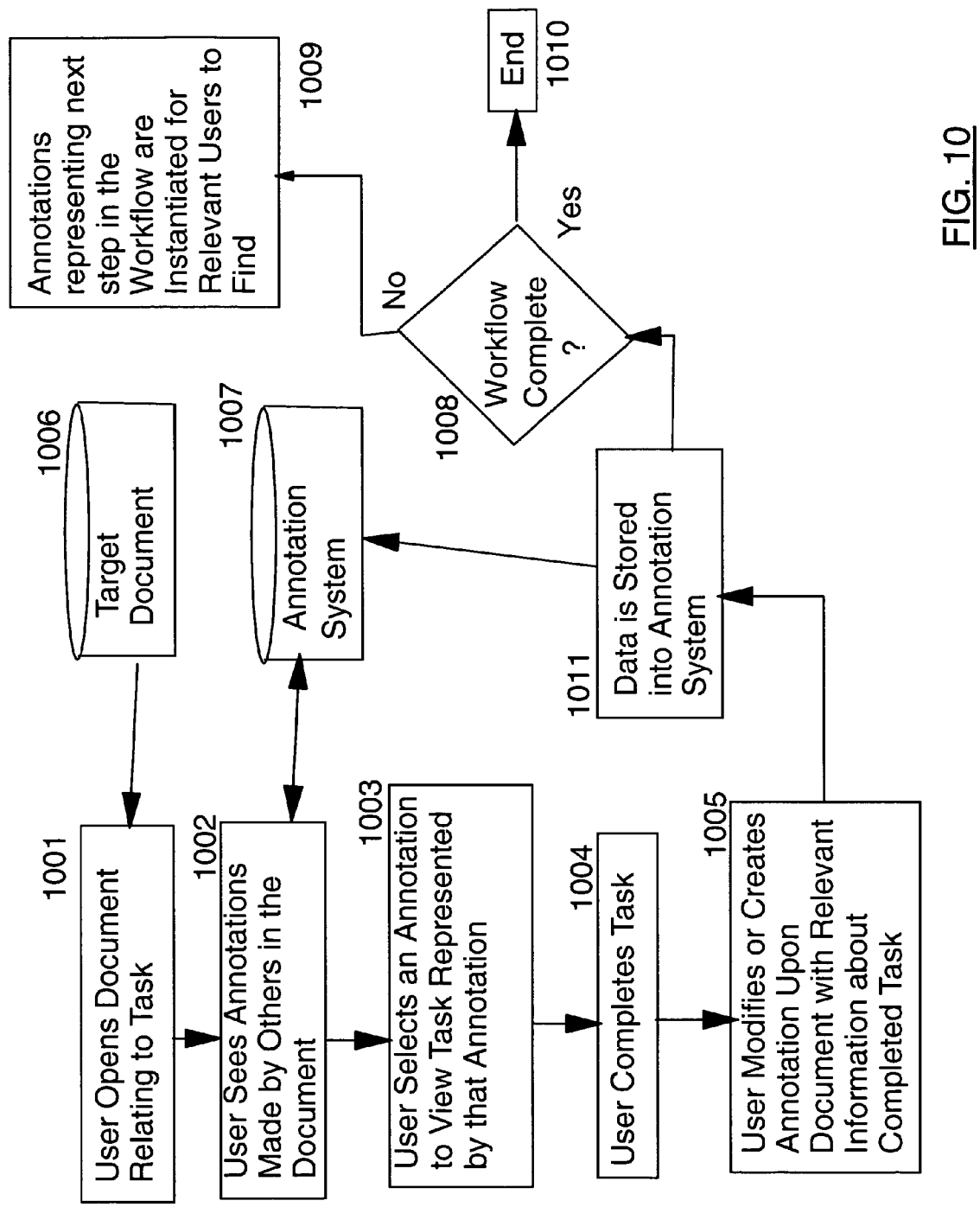
FIG. 10 is a flow depicting an Annotation based Workflow user activity according to the invention.
Figure 11:
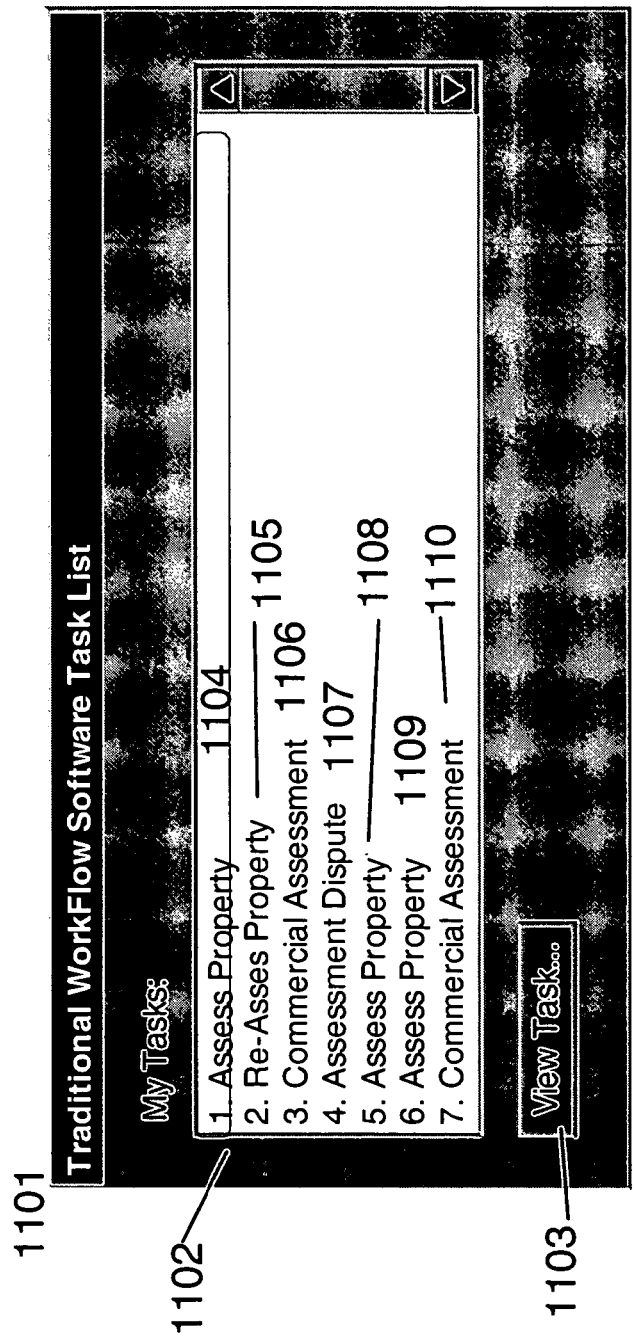
FIG. 11 is an example view of an example Prior Art Workflow task list.
Figure 12:
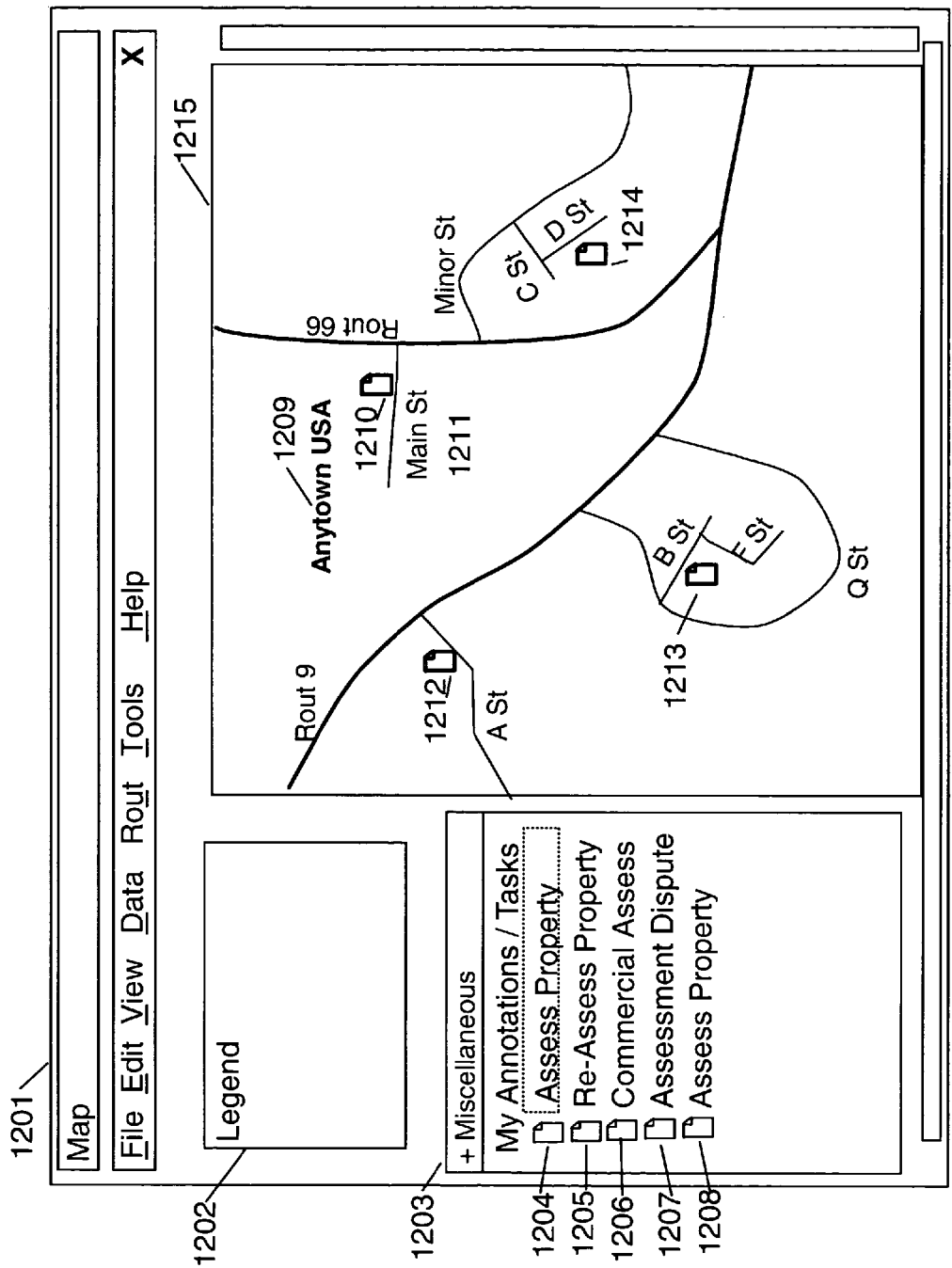
FIG. 12 is a Map example document-centric Workflow task list based on Annotations.

FIG. 11 shows an example of a prior art Forms based workflow software task list 1102. Typically, a user would run a workflow application and see a screen 1101 such as that of FIG. 11. The documents and data relating to the workflow tasks are completely separate to the standalone workflow software. In contrast, FIGS. 12 and 13 show two examples of annotation-based workflow task lists 1203 1304 1305 1306. The task list in an annotation-based workflow system is not a flat list. Instead, each task is represented in context as an annotation. In FIG. 120, each task 1204 1205 1206 1207 1208 is represented by the paper icons 1210 1212 1213 1214 over the map. In FIG. 13, the tasks are represented by the oval comment boxes 1304 1305 1306 that reference specific contextual parts of the document 1303 with the dashed delimiting lines shown. Those two examples illustrate that with the Annotation-based Workflow system of the present invention, the document is the central aspect of the workflow system. The workflow system has no stand-alone application for viewing and managing tasks. Instead since the workflow is represented as an annotation, then any annotation-enabled application can be enhanced with workflow-functionality. The examples in FIG. 10 show MICROSOFT MAPPOINT and MICROSOFT WORD (from MICROSOFT CORPORATION) as examples of existing applications that can be extended to be annotation-workflow aware simply by having annotation support. An architecture such as that used by the IBM INSIGHTLINK (from IBM Corp) annotation system and described in the IBM U.S. patent application Ser. No. 10/600,014 "Universal Annotation Management System" filed Jun. 20, 2003 incorporated herein by reference, can be used to extend application with annotation functionality.

The present invention merges the traditional workflow software concepts of tasks and collaborative work on the same task together with the tradition annotation concepts of deep integration with a document and simple discovery and analysis. Previously, annotations were thought of as a single observation by a single individual about object(s) and sub-object(s). However, some processes benefit from a collection of different individual thoughts. Our invention provides an annotation system with such a benefit.

By combining the two ideas a new type of system is created in which workflow process can be automatically attached to any objects that can annotated, without requiring that the object being annotated or actually be under the control of the workflow process. The presence of annotation is the vehicle for gathering the output of each stage of a workflow pipeline. Where this in particular is different from a regular workflow system is that any actor (with permission to see the annotation) can now participate in editing or simply viewing the results of a workflow process.

The annotation paradigm gives the user an improved view of the pending tasks, and more importantly, an improved association with the target data relevant to the workflow task. In a traditional form-based workflow system, the pending task list presented to the user is workflow-centric. That means that the user interacts with the system mainly as a flat list of tasks. The user opens or starts a pending task to determine the data that is relevant to accomplishing the task. The annotation paradigm of our invention is not workflow-centric or based around a flat list of pending tasks. The annotation paradigm of our invention presents a data-centric interaction mechanism that is more suited to many types of problems. For example, imagine a hypothetical application that is used by city real estate assessors. Every day, a real estate assessor must travel to multiple properties to assess their value for property tax collection purposes. A traditional workflow system would present the user (assessor) with a flat list of properties to be assessed.

Figure 9:
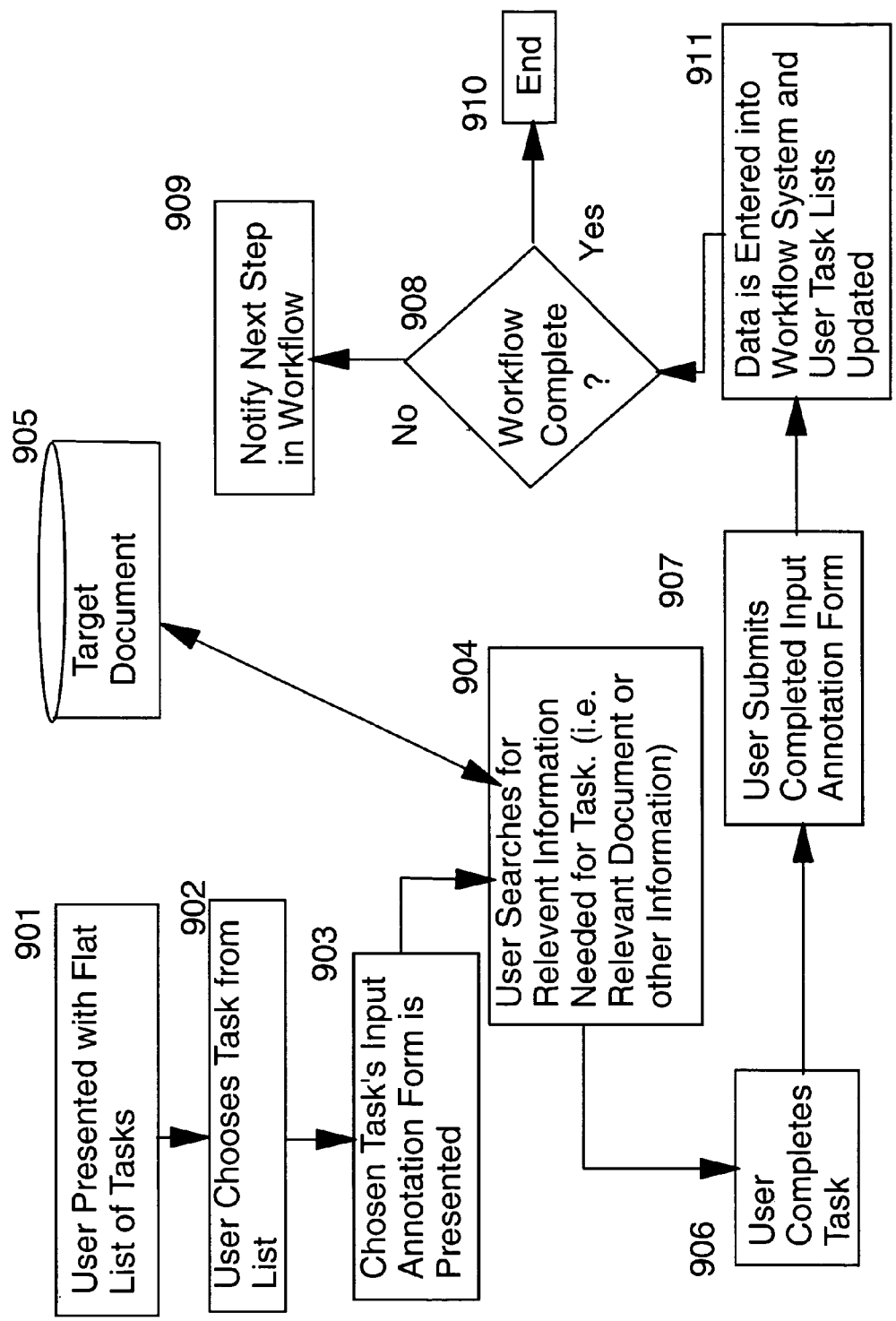
FIG. 9 is a flow depicting a Prior Art Form-based Workflow user activity flow.

FIG. 9 shows a flowchart that describes the steps a user, such as a Real Estate assessor for example, would take in using a prior art traditional workflow system for this task. Typically the assessor would open or view the first task 902 from a flat list of pending tasks 901, look for the address 904 stored in a target database 905, and travel to the property to assess it. The Assessor would, after 906 assessing the property, complete a Form 907 and enter it into the Workflow System 911 and send it on to the next workflow step 909 unless his was the last step 910. Then the assessor would open or view the next task in the list 903, look at the address 904, and travel to the next property to assess it 906. Such a traditional workflow system would make it difficult for the assessor to efficiently map out his route between properties to travel the least distance or choose convenient locations. It is possible the traditional workflow system could be enhanced to perform path planning in or in some way prioritize the list based on some metric, but such functionality would be custom designed and not part of the workflow system itself. The present invention provides for the user to customize his activities rather than deal with restrictions imposed by prior art forms based workflow system. In this example, the "document" 905 that the user interacts with to perform the task 906 of traveling to a property and assessing it is the address of the house to be assessed. It is the information the user needs to accomplish his task. Notice that in the traditional workflow flowchart the user reads this "document" 904 late in the stage after selecting the task. Our invention, using the annotation paradigm would allow for a much more natural and efficient operation by the user. Our annotation based workflow system would treat the property as the relevant target "document" for the annotation. The assessor could then use an annotation-enabled Geographic Information System (GIS) or mapping application such as MICROSOFT MAPPOINT from MICROSOFT Corp. to view the task list in a data-centric manner rather than the traditional workflow-centric flat task list.

With the present invention, each morning the assessor would open his map application and see a map of the city (Reference FIG. 12) 1215. As he zooms into the area for which he is responsible, he sees icons 1210 1212 1213 1214 on the map 1215 over properties that need to be assessed. Those icons 1210 1212 1213 1214 represent annotations and in our invention, they are his pending tasks. By presenting the task list 1210 1212 1213 1214 in a data-centric manner, the assessor is immediately able to easily prioritize and map an efficient route to perform the current day's property assessments. The fact that our invention attaches a workflow to arbitrary target data makes this functionality an inherent advantage of the system. Simply because the property was chosen as the target data for the annotation, the assessor sees immediate advantages over the traditional workflow task list model.

FIG. 10 shows a flowchart that describes the steps a user, such as an assessor as in this example, would take in using an annotation-based workflow system for this task. Notice that the "document" 1006, in this example being the location of the property 1210 1212 1213 1214 upon a map 1215, is the driving factor in task selection rather than simply a referenced data as in the traditional flowchart in FIG. 9. According to FIG. 10, a user (assessor) opens a document 1215 from storage 1006 relating to the task. The user sees annotations (as icons 1210 1212 1213 1214) made by others in the Document 1215. The user selects an annotation 1212 to view a task represented by the annotation 1212 retrieved from the annotation database 1007. The user completes the task (assessment) 1004 and modifies or creates an Annotation on the document 1215 with relevant information about the completed task 1005. The data is stored 1011 in the annotation system 1007. If 1008 the workflow is complete, the process is ended 1010. If not, Annotations 1210 1212 1213 1214 representing the next step in the workflow are instantiated for relevant users to find 1009.

Figure 3:
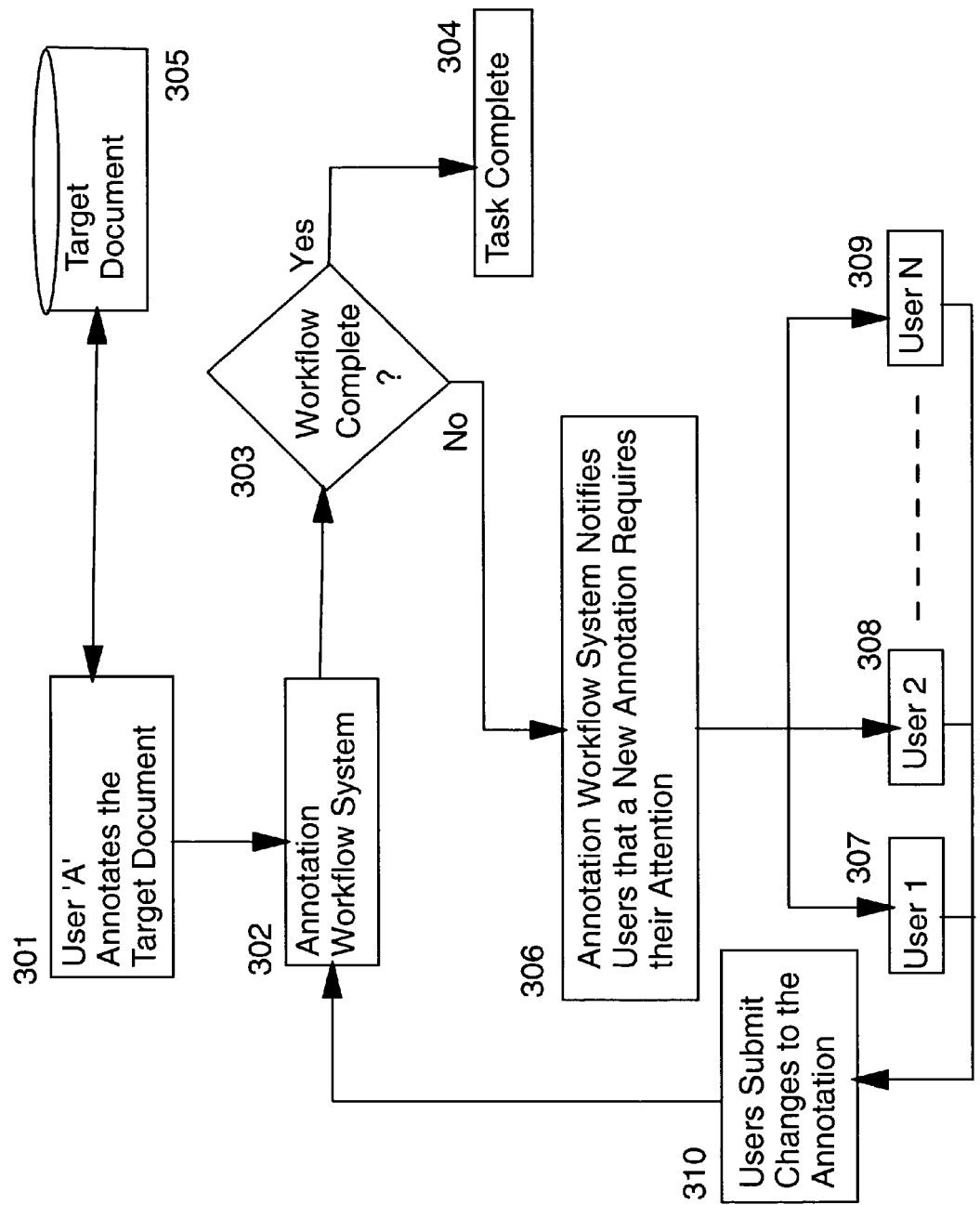
FIG. 3 is a flow representation of Workflow annotation according to the invention.

FIG. 3 illustrates an example of the interaction between users and the annotation workflow system. First, User A, having located a target document 305 of interest, creates an annotation 301 upon the target document using the Annotation Workflow System 302. Upon submitting that annotation 301, a specific workflow configured in the Annotation Workflow System is started and the next step in the workflow is taken. This step can include the notification of a plurality of users 306. In FIG. 3, user 1 307 through N 309 might be human users but can also be agents or computer programs that perform a specific task. Once the human or computer user 307 308 309 records their results 310, if any, in the form of changes and additions to the annotation, then the Annotation Workflow System 302 retrieves the next step in the configured workflow 306. If there are no steps remaining 304 in the workflow, then the task is complete, otherwise, the appropriate users for the next step are notified 306. The process continues until the workflow task is complete. At any step in the workflow, the user has access to and can makes use of the target document to view the annotation in context.

FIGS. 4 through 8 show example user interface screens of the collaboration between multiple users. The users are being assisted in their collaboration by an example embodiment of the Annotation Workflow System as they accomplish an example task. The example task is that of evaluating a candidate for a job opening. There are three users involved in the example workflow: the resume evaluator, the interviewer, and the hiring manager. Each user in this example workflow takes a step in sequential order. That is, the resume evaluator must decide whether to interview the candidate at which point the interviewer will be assigned to proceed with the interview upon which the hiring manager will be tasked with deciding the salary and whether to hire the candidate. FIG. 4 shows the screen 401 of the resume evaluator after he has hit the 'Create Annotation' button and is being prompted by a Select Annotation Form window 408 for the type of annotation to create. The Annotation Workflow System can be configured with many types of annotations, each representing different data to gather for a different task to be accomplished. The evaluator chooses to create a 'Candidate Resume Evaluation' type 412 of annotation by highlighting the corresponding entry 412 in the Select Form area 414 of the window 408. Then the evaluator sees the screen shown in FIG. 5 401 with a Create Annotation window 501. The annotation 501 has many fields 505-511 513 to be entered by the evaluator such as the type of employment 507 and prior experience information 509. However, the annotation also shows fields that are not writeable 512 514 515 516 by the evaluator as signified by a black padlock icon next to the field name 512 515. Those fields are the responsibility another user in the workflow. Once the evaluator is done entering information he submits the annotation 502. The interviewer is now notified of a pending annotation and when the interviewer opens the resume document 402, the interviewer sees that there is an annotation 601 on the document 402 as shown in FIG. 6. The list 601 on the left of the document shows the annotations on the document. The interviewer clicks on the list item 601 which opens a window 610 that presents information about the annotation associated with the list item 601. The interviewer then interviews the candidate and opens the annotation window 710 for editing as shown in FIG. 7. Note that the interviewer has a different view of the annotation customized to his particular task. Specifically, the evaluator's previously entered fields are read-only as shown by the black padlocks 505 506 507 509 511 and his fields 512 515 are available for entry. Once the interviewer submits 502 his comments about the candidate, the hiring manager is notified of a pending annotation. When the manager opens the document (FIG. 8) 401 and opens the annotation 501 for editing the manager sees the screen 810 for annotation. Note that this view is different from both the evaluator and interviewer's annotation views. The screen 810 shown has been scrolled down to reveal two extra fields 801 802 at the end, 'Salary' 801 803 and 'Hire?' 802 804. The Annotation Workflow system was configured to hide these fields for the evaluator view 610 and interviewer view 710. Only the manager view 810 is privileged to see and modify those fields. Note also that all of the information previously entered by the evaluator and interviewer is shown for the manager to use in making his judgment. Once the manager submits 502 the annotation with his changes 801, even further automated workflow steps might be initiated such as the mailing of an offer letter, or forwarding to other managers for awareness. An awareness recipient might choose to annotate the document adding another item to the list, for instance, a manager might see that the employee having Widget Skills 405 might paste an annotation to that item on the resume Document 402 indicating that the skill would be of particular use on a certain project. The manager of the project would then see the item indicating a skill annotation and modify the annotation with specific roles, time frame, and sub-project portion that the candidate might be assigned when hired. The system can also be configured to make automated decisions at any point. For instance, after the resume was evaluated initially 610, the system might drop any candidates that have no experience. The interviewers views 710 would automatically only receive qualified candidates. Also, notifications can be sent out intelligently based on conditions and query parameters such as only interviewing the top 10 candidates of all the resumes evaluated. The important thing to note is that this task was heavily focused around the annotation of a document. The natural post-it note paradigm was infused by our invention with a collaborative authoring and workflow functionality.

One embodiment of the Annotation Workflow System consists of an Annotation Workflow Engine which communicates with a database to store annotations. The Annotation Workflow Engine is configured with the annotation layouts and specific workflow for each annotation. The Annotation Workflow Engine also communicates with a user directory for determining particular user's roles and privileges in the configured workflows. The Annotation Workflow Engine exposes the following set of operations to its clients:

1. query of all annotations upon a given document for a given user
2. retrieval of specific annotations given an annotation id and specific user
3. editing of specific annotations given an annotation id and specific user
4. listing of configured annotation types or workflows
5. creation of a new annotation based on one of the configured types of annotations The Annotation Workflow Engine can be implemented as a web service, the user directory can be a standard Lightweight Directory Access Protocol (LDAP) server, and the annotation database can be a standard relational database such as IBM's DB2 system. The clients that interact directly with the users and communicate on their behalf with the Annotation Workflow Engine can be written as plug-ins into existing document viewer applications. For instance, the MICROSOFT OFFICE suite of products from MICROSOFT CORPORATION provides an extensibility and integration application programming interface (API) to allow third parties to extend the functionality of the applications directly. The communication with the Annotation Workflow Engine and the presentation of annotations can be implemented as such a plug-in.

The architecture described so far is consistent with the architecture for an annotation system described in IBM U.S. patent application Ser. No. 10/600,014 "Universal Annotation Management System" filed Jun. 20, 2003 incorporated herein by reference. The main changes from that architecture is that the annotation engine has the added configuration information and functionality of interpreting configured workflows and taking the appropriate action at each step of the workflow such as pending work notifications.

The configuration of a workflow can be achieved together with the configuration of an annotation type. With every field that is added to annotation information about who is able to read and write each field is added along with constraints on the field being required or optional and other such restraints. Also with each field in the configuration for an annotation type a list of conditions and actions is defined. These conditions will be evaluated upon annotation submission by the Annotation Workflow Engine. The engine will perform the action described for any conditions that evaluate to a 'true' value. Conditions and actions can even be described in languages such as JavaScript and Perl but need not be so generic. Conditions and actions can reference external data sources such as other databases and web services and can even modify annotations or other data sources when executed. However, they need not be so elaborate, especially for security reasons, the actions should run in a limited or sandboxed environment. The conditions and actions can also be evaluated and performed either at the Annotation Workflow Engine or also at the client plug-in application.

The following describes the implementation of a user interaction with the system from start to finish as the user opens a document to view the tasks, presented in the form of annotations, and completes the task. The embodiment of the described invention is illustrative of the elements of the invention.

The scenario is that of the assessor example described above. An assessor is assigned properties to assess via the workflow system. The assessor is a central step in the example workflow. The tasks have been assigned to him by a user in a prior step of the workflow, such as the assessor's manager or supervisor by attaching an annotation icon (FIG. 12) 1212 1210 1214 1213 to a map 1215. After the assessor finishes each task, the next step in the workflow is given a subsequent task in the workflow. For example, the subsequent task after a property is assessed might be the responsibility of a tax collector to send a tax bill to the property owner.

The first step is the assessor starts the annotation-enabled MICROSOFT MAPPOINT application to view his assigned tasks. The assessor sees a screen 1201 as shown in FIG. 12. The annotations 1204 1205 1206 1207 1208 represent the tasks. To provide this view, a plugin component has been added to MICROSOFT MAPPOINT to communicate with a central annotation-workflow server. Upon the user starting the MICROSOFT MAPPOINT application, the application loads the annotation plugin in the form of a Component Object Model (COM) component contained in a Windows Dynamic Link Library (DLL) file and registered as a MAPPOINT plugin in the MICROSOFT MAPPOINT section of the Windows Registry. Once the annotation-workflow plugin has been loaded by the MAPPOINT application, the plugin queries the annotation-workflow server for all annotations that apply to the assessor and the area being viewed by him. This query is accomplished as an HTTP request to the annotation-workflow server at a well-known address on the network. Typically the assessor would have previously configured the plugin with the network address of his company's deployed annotation-workflow server. The HTTP request sent to the server includes information such as the particular document for which annotations should be retrieved as well as contextual information such as the particular user making the request and the application from which the request is being made. All of that information is then used by the annotation-workflow engine as input parameters to create a Structured Query Language (SQL) query to a relational database store which contains the annotation and workflow information. The response to the HTTP request contains the resulting annotations that match those query parameters. In particular a unique identifier for each annotation along with information about where in the document the annotation applies is returned. The plugin then uses that information to render the icons appropriately on screen for the user to see.

Next, the assessor chooses an annotation to edit. The assessor double-clicks on one of the annotations displayed 1212 and an annotation editing GUI is presented by the plugin. To present this GUI, the plugin communicates again with the annotation-workflow server. It sends another HTTP request to the server including, as a parameter within the HTTP request, the unique annotation identifier of the user-selected annotation. In response, the server does another SQL query to retrieve the data inside the particular annotation as well as the schema to which the annotation data conforms. When the plugin receives this data, which is formatted as an extensible Markup Language (XML) document, the plugin uses an extensible Stylesheet Language (XSL) document to transform the annotation data and schema into a rendered presentable form. Specifically, the XSL document converts the data and schema into a HyperText Markup Language (HTML) document which is presentable to the user using a web browser component such as MICROSOFT Internet Explorer. The annotation schema describes the annotations structure and includes information such as data entry fields and their types (i.e. String field called Title, Number field called ZipCode, or Currency field called AssesedValue). The schema information can contain more advanced information also such as access control lists for fields (i.e. Salary field is read-only to everyone except user in the Managers group) and information about the field being required or optional among other such information. The annotation data simply contains the actual values that exist for the fields described in the schema (i.e. ZipCode field value is 02142). The annotation-workflow system can typically be configured to contain multiple annotation schemas to define different types of annotations. The particular schema that applies to an annotation is selected by the user upon creation of the annotation. After that, the annotation's unique identifier is associated with its schema within the relational database employed by the annotation-workflow server.

Once the annotation form is rendered via an embedded web browser component such as MICROSOFT Internet Explorer as described above, the user is allowed to enter and edit the data of the annotation. The assessor in this case adds notes about the property as prescribed by the annotation form and enters the final assessment of the property's value into the annotation form. Once all of the data is entered, the user clicks the 'submit' button on the form to submit the annotation data. At this point, the plugin gathers the entered and edited annotation data and formats it as parameters into another HTTP request sent to the annotation-workflow server. When the server receives this request, it inserts the new data into its relational database store keyed by the unique annotation identifier. It then queries its configuration information to determine the next workflow step associated with a submission of that annotation. The workflow steps are previously configured by a system administrator. Having found the next step in the workflow, the annotation-workflow server performs the required action which typically includes making the annotation available in the appropriate place for the next user in the workflow.

In the example above, the plugin communicates via HTTP requests. That communication can be accomplished via multiple means including but not limited to WebServices via a number of different transport protocols and wire encodings or other distributed computing technologies such as the Component Object Request Broker Architecture (CORBA) or even simple sockets-based custom TCP protocols.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A method for workflow annotation of a workflow in a workflow system, the method comprising:
   based on a first GUI action, obtaining, by a processor, a workflow document from a document store;
   based on a workflow document key, obtaining one or more workflow annotation widgets from an annotation store, the annotation store comprising widget positioning information;
   presenting to a GUI display, the one or more workflow annotation widgets overlaid on the workflow document according to the widget positioning information, wherein the one or more workflow annotation widgets each represent a workflow task in a workflow, and wherein the one or more workflow annotation widgets are presented as selectable icons on the workflow document;
   based on a second GUI action selecting a desired workflow annotation widget of the GUI displayed one or more workflow annotation widgets, retrieving, annotation data associated with the desired workflow annotation widget and a schema to which the annotation data conforms to, wherein the schema describes a structure associated with the annotation data, and wherein the annotation data and the schema are stored separate from each other in the annotation store;
   generating, based on retrieving the annotation data and the schema, an annotation document corresponding to the workflow task represented by the workflow annotation widget that has been selected, the annotation document comprising first information and first functionality, the workflow system configured to provide a first customized view and a second customized view of the annotation document;
   presenting to the GUI display the first customized view of the annotation document, wherein the first customized view comprises a first set of elements and at least a second set of elements of the annotation document being displayed to a first user, wherein the first set of elements are modifiable by the first user, wherein the second set of elements are only modifiable by at least a second user, wherein modifications made to the first set of elements and the second set of elements are storable in the annotation store by the first user and the second user, respectively, and wherein the first set of elements and the at least second set of elements being displayed in a non-segregated manner;
   receiving one or more modifications made to at least one of the first set of elements and the second set of elements;
   based on receiving the one or more modifications, identifying a next workflow task in the workflow;
   based on identifying the next workflow task, identifying a workflow annotation widget representing the identified next workflow task; and
   instantiating the identified workflow annotation widget, the instantiating at least making the identified workflow annotation widget available in the workflow document as a selectable icon for one or more users.

2. The method according to claim 1, based on receiving the one or more workflow actions, performing a workflow action comprising any one of ending the workflow or informing another user of the workflow action.

3. The method according to claim 1, further comprising:
   displaying a task list with the annotation document, the task list listing workflow tasks to be performed by a user.

4. The method according to claim 1, wherein the first customized view is customized for one or more user roles such that elements of the annotation document are displayed differently for a first user role than for a second user role.

5. The method according to claim 1, wherein the annotation document comprises one or more annotation structures, an annotation structure of the one or more annotation structures comprising a title field for prompting a user for annotation data, the annotation document further comprising a data entry field for receiving user provided annotation data.

6. The method according to claim 1, wherein the annotation document comprises one or more workflow notification annotation structures, a workflow notification annotation structure of the workflow annotation structures comprising a workflow title field, the workflow title field for prompting a user for a workflow action, the workflow notification annotation structure further comprising a workflow notification program for performing a workflow notification action.

7. The method according to claim 1, wherein performing a workflow action further comprises:
   sending a notification to responsible users, the responsible users responsible for taking a next step in a workflow associated with the annotation document.

8. The method according to claim 1, wherein the notification comprises any one of an email, a phone message, a text message, an instant message, a portion of data within the annotation document or a portion of an annotation within the annotation document.

9. The method according to claim 1, wherein based on a third GUI action selecting the first functionality of the corresponding annotation document performing a workflow action comprising any one of ending the workflow, transforming the workflow to a next workflow step, or informing another user of the workflow action.

10. A computer program product for workflow annotation of a workflow in a workflow system, the computer program product comprising:
a non-transitory storage medium readable by a processing circuit and storing instructions for execution by a processing circuit for performing a method comprising:
based on a first GUI action, obtaining, by the processing circuit, a workflow document from a document store;
based on a workflow document key, obtaining one or more workflow annotation widgets from an annotation store, the annotation store comprising widget positioning information;
presenting to a GUI display, the one or more workflow annotation widgets overlaid on the workflow document according to the widget positioning information, wherein the one or more workflow annotation widgets each represent a workflow task in a workflow, and wherein the one or more workflow annotation widgets are presented as selectable icons on the workflow document;
based on a second GUI action selecting a desired workflow annotation widget of the GUI displayed one or more workflow annotation widgets, retrieving, annotation data associated with the desired workflow annotation widget and a schema to which the annotation data conforms to, wherein the schema describes a structure associated with the annotation data, and wherein the annotation data and the schema are stored separate from each other in the annotation store;
generating, based on retrieving the annotation data and the schema, an annotation document corresponding to the workflow task represented by the workflow annotation widget that has been selected, the annotation document comprising first information and first functionality, the workflow system configured to provide a first customized view and a second customized view of the annotation document;
presenting to the GUI display the first customized view of the annotation document, wherein the first customized view comprises a first set of elements and at least a second set of elements of the annotation document being displayed to a first user associated with a first user role, wherein the first set of elements are modifiable by the first user, wherein the second set of elements are only modifiable by at least a second user associated with a second user role, wherein modifications made to the first set of elements and the second set of elements are storable in the annotation store by the first user and the second user, respectively, and wherein the first set of elements and the at least second set of elements being displayed in a non-segregated manner;
receiving one or more modifications made to at least one of the first set of elements and the second set of elements;
based on receiving the one or more modifications, identifying a next workflow task in the workflow;
based on identifying the next workflow task, identifying a workflow annotation widget representing the identified next workflow task; and
instantiating the identified workflow annotation widget, the instantiating at least making the identified workflow annotation widget available in the workflow document as a selectable icon for one or more users.

11. The computer program product according to claim 10, based on receiving the one or more workflow actions, performing a workflow action comprising any one of ending the workflow or informing another user of the workflow action.

12. The computer program product according to claim 10, further comprising:
displaying a task list with the annotation document, the task list listing workflow tasks to be performed by a user.

13. The computer program product according to claim 10, wherein the annotation document comprises one or more annotation structures, an annotation structure of the one or more annotation structures comprising a title field for prompting a user for annotation data, the annotation document further comprising a data entry field for receiving user provided annotation data.

14. The computer program product according to claim 10, wherein the annotation document comprises one or more workflow notification annotation structures, a workflow notification annotation structure of the workflow annotation structures comprising a workflow title field, the workflow title field for prompting a user for a workflow action, the workflow notification annotation structure further comprising a workflow notification program for performing a workflow notification action.

15. The computer program product according to claim 10, wherein performing a workflow action further comprises:
sending a notification to responsible users, the responsible users responsible for taking a next step in a workflow associated with the annotation document.

16. The computer program product according to claim 15 wherein the notification comprises any one of an email, a phone message, a text message, an instant message, a portion of data within the annotation document or a portion of an annotation within the annotation document.

17. The computer program product according to claim 10, wherein based on a third GUI action selecting the first functionality of the corresponding annotation document performing a workflow action comprising any one of ending the workflow, transforming the workflow to a next workflow step, or informing another user of the workflow action.

18. A workflow system for workflow annotation of a workflow, the system comprising:
a computer system comprising at least one processor and memory, the computer system being configured to communicate with a network, and wherein the computer system is configured to perform a method comprising:
based on a first GUI action, obtaining a workflow document from a document store;
based on a workflow document key, obtaining one or more workflow annotation widgets from an annotation store, the annotation store comprising widget positioning information;
presenting to a GUI display, the one or more workflow annotation widgets overlaid on the workflow document according to the widget positioning information, wherein the one or more workflow annotation widgets each represent an annotation document associated with the workflow document, and wherein the one or more workflow annotation widgets are separate and distinct from the annotation document;

based on a second GUI action selecting a desired workflow annotation widget of the GUI displayed one or more workflow annotation widgets, retrieving, annotation data associated with the desired workflow annotation widget and a schema to which the annotation data conforms to, wherein the schema describes a structure associated with the annotation data, and wherein the annotation data and the schema are stored separate from each other in the annotation store;

generating, based on retrieving the annotation data and the schema, a corresponding annotation document comprising first information and first functionality, the corresponding annotation document corresponding to a first workflow step in the workflow document, wherein the workflow system is configured to provide a first customized view and a second customized view of the corresponding annotation document;

presenting to the GUI display the first customized view of the corresponding annotation document, wherein the first customized view comprises a first set of elements and at least a second set of elements of the corresponding annotation document being displayed to a first user, wherein the first set of elements are modifiable by the first user, wherein the second set of elements are only modifiable by at least a second user, wherein modifications made to the first set of elements and the second set of elements are storable in the annotation store by the first user and the second user, respectively, and wherein the first set of elements and the at least second set of elements being displayed in a non-segregated manner;

determining that the first user has updated the corresponding annotation document;

identifying, based on the determining, at least a second workflow step in the workflow document;

identifying at least one workflow annotation widget presented on the GUI display corresponding to the second workflow step; and at least one of changing an appearance of the at least one workflow annotation widget and a location of the at least one at least one workflow annotation widget in the GUI display.

19. The system according to claim 18, wherein the method further comprises:

based on determining that the first user has updated the corresponding annotation document, performing a workflow action comprising any one of ending the workflow or informing another user of the workflow action.

20. The system according to claim 18, wherein the method further comprises:

displaying a task list with the corresponding annotation document, the task list listing workflow tasks to be performed by a user.

21. The system according to claim 18, wherein the first customized view is customized for one or more user roles such that elements of the corresponding annotation document are displayed differently for the first user role than for the second user role.

22. The system according to claim 18, wherein the annotation document comprises one or more annotation structures, an annotation structure of the one or more annotation structures comprising a title field for prompting a user for annotation data, the annotation document further comprising a data entry field for receiving user provided annotation data.

23. The system according to claim 18, wherein the annotation document comprises one or more workflow notification annotation structures, a workflow notification annotation structure of the workflow annotation structures comprising a workflow title field, the workflow title field for prompting a user for a workflow action, the workflow notification annotation structure further comprising a workflow notification program for performing a workflow notification action.

24. The system according to claim 18, wherein performing a workflow action further comprises:

sending a notification to responsible users, the responsible users responsible for taking a next step in a workflow associated with the corresponding annotation document.

25. The system according to claim 24, wherein the notification comprises any one of an email, a phone message, a text message, an instant message, a portion of data within the corresponding annotation document or a portion of an annotation within the corresponding annotation document.

26. The system according to claim 18, wherein based on a third GUI action selecting the first functionality of the corresponding annotation document performing a workflow action comprising any one of ending the workflow, transforming the workflow to a next workflow step, or informing another user of the workflow action.

* * * * *